(12) United States Patent
Sullivan

(10) Patent No.: US 7,142,775 B2
(45) Date of Patent: Nov. 28, 2006

(54) METHODS, SYSTEMS AND DATA STRUCTURES FOR TIMECODING MEDIA SAMPLES

(75) Inventor: Gary J. Sullivan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 22 days.

(21) Appl. No.: 11/025,385

(22) Filed: Dec. 29, 2004

(65) Prior Publication Data

US 2005/0111828 A1  May 26, 2005

Related U.S. Application Data

(62) Division of application No. 09/931,388, filed on Aug. 15, 2001, now Pat. No. 7,024,097.

(60) Provisional application No. 60/225,498, filed on Aug. 15, 2000.

(51) Int. Cl.
*H04N 5/91* (2006.01)

(52) U.S. Cl. .......................... 386/65; 386/46; 386/116; 348/512

(58) Field of Classification Search ................ 386/65, 386/46, 116; 348/515
See application file for complete search history.

(56) References Cited

U.S. PATENT DOCUMENTS

| | | | |
|---|---|---|---|
| 4,766,504 A | 8/1988 | Narusawa et al. | |
| 4,847,877 A | 7/1989 | Besseyre | |
| 5,091,899 A | 2/1992 | Adachi et al. | |
| 5,097,364 A | 3/1992 | Goto et al. | |
| 5,661,665 A | 8/1997 | Glass et al. | |
| 5,870,444 A | 2/1999 | Mynett et al. | |
| 5,898,897 A | 4/1999 | Son et al. | |
| 5,946,043 A | 8/1999 | Lee et al. | |
| 5,955,977 A | 9/1999 | Lei | |
| 5,956,090 A | 9/1999 | Yamauchi | |
| 6,075,576 A | 6/2000 | Tan et al. | |
| 6,266,158 B1 | 7/2001 | Hata et al. | |
| 6,330,214 B1 | 12/2001 | Ohta et al. | |
| 6,487,361 B1 | 11/2002 | Galt et al. | |

FOREIGN PATENT DOCUMENTS

| | | |
|---|---|---|
| EP | 1 069 777 A1 | 1/1701 |
| EP | 0 886 398 A1 | 12/1998 |

(Continued)

OTHER PUBLICATIONS

Cipher Digital, Inc; Time Code Handbook, 1990, Cipher Digital, Inc, pp. 15, 18, 21-22, 52-53.*

(Continued)

*Primary Examiner*—Thai Tran
*Assistant Examiner*—James A. Fletcher
(74) *Attorney, Agent, or Firm*—Lee & Hayes, PLLC

(57) ABSTRACT

Timecoding systems, methods and data structures are described which, in some embodiments, permit a true time to be ascertained from media samples whose timecodes contain an amount of drift which can arise from having non-integer frame rates. Inventive methods incorporate the use of an offset parameter that describes a time difference between a timecode and a true time associated with a media sample. The inventive approaches can be incorporated with and used compatibly in connection with current timecoding paradigms such as SMPTE timecode and the like. Further embodiments permit timecoding to take place at the field level of a frame. This can permit true-time calculations to be done to ascertain the true time associated with individual fields of a frame. In addition, other embodiments provide novel counting compensation methods that are directed to reducing the drift that can be associated with media samples that are sampled at non-integer frame rates.

12 Claims, 6 Drawing Sheets

FOREIGN PATENT DOCUMENTS

| | | |
|---|---|---|
| EP | 0 948 214 A2 | 10/1999 |
| EP | 1 018 840 A2 | 7/2000 |
| EP | 1 043 892 A1 | 10/2000 |
| EP | 1 079 631 A1 | 2/2001 |
| EP | 1 111 932 A2 | 6/2001 |
| WO | WO 99/56472 | 11/1999 |
| WO | WO 00/56077 | 9/2000 |
| WO | WO 00/64186 | 10/2000 |

OTHER PUBLICATIONS

Anderson, David B., "A Proposed Method for Creating VCR Functions using MPEG Streams," IEEE, 1996, pp. 380-382.

Richard Williams, "How-to All in Good Timecode," Adobe Magazine, Spring 1999, pp. 57-59.

TCP—101i Time Code Processor Guide to Installation and Operation M133-9900-200, Miranda Technologies Inc., 1999, pp. i-vii; 1-47.

Lei, Shaw-Min, "The construction of efficient variable-length codes with clear synchronizing codewords for digital video applications," SPIE vol. 1605, Visual Communications and Image Processing '91: Visual Communication, Nov. 11, 1991, pp. 863-873.

Stockhammer, Thomas et al., "H.26L/JVT Coding Network Abstraction Layer and IP-Based Transport," Proceedings 2002 Int'l. Conference on Image Processing, ICIP 2002, IEEE, Sep. 22-Sep. 25, 2002, pp. 485,488.

Cipher Digital, Inc.; Time code Handbook; 1990; Cipher Digital; Chapters 3 and 5.

Cipher Digital, "Time Code Handbook", 1990, Cipher Digital, p. 42.

* cited by examiner

100 ⟶

| Seconds(s) | Frames(f) |
|---|---|
| 0 | 1 |
| 0 | 2 |
| 0 | 3 |
| 0 | 4 |
| . | . |
| . | . |
| . | 29 |
| 1 | 0 |

| Offset | Seconds(s) | Frames(f) |
|---|---|---|
| 0 | 0 | 1 |
| 0 | 0 | 2 |
| 0 | 0 | 3 |
| 0 | 0 | 4 |
| . | . | . |
| . | . | . |
| . | . | 29 |
| 30 | 1 | 0 |

Fig. 2

METHODS, SYSTEMS AND DATA STRUCTURES FOR TIMECODING MEDIA SAMPLES

RELATED APPLICATION

This application is a divisional of and claims priority to both U.S. application Ser. No. 09/931,388, filed on Aug. 15, 2001 now U.S. Pat. No. 7,024,097 which, in turn, stems from and claims priority to U.S. Provisional Application Ser. No. 60/225,498, filed on Aug. 15, 2000, the disclosures of which are incorporated by reference herein.

TECHNICAL FIELD

This invention relates to methods, systems, and data structures for timecoding media samples.

BACKGROUND

The concept of recording and using timing information is fundamental to the needs of multimedia applications. Pictures, video, text, graphics, and sound need to be recorded with some understanding of the time associated with each sample of the media stream. This is useful in order to synchronize different multimedia streams with each other, for carrying information to preserve the original timing of the media when playing a media stream for a user, for identifying specific locations within a media stream, and also for recording the time associated with the media samples for purposes of creating a scientific or historical record. For example, if audio and video are recorded together but handled as separate streams of media data, then timing information is necessary for coordinating the synchronization of these two (or more) streams.

Typically, a media stream (such as a recorded audio track or recorded video or film shot) is represented as a sequence of media samples, each of which is associated (implicitly or explicitly) with timing information. A good example of this is video and motion picture film recording, which is typically created as a sequence of pictures, or frames, each of which represents the camera view for a particular short interval of time (e.g., typically $\frac{1}{24}$ seconds for each frame of motion picture film). When this sequence of pictures is played back at the same number of frames per second (known as the frame rate) as used in the recording process, an illusion of natural movement of the objects depicted in the scene can be created for the viewer.

Similarly, sound is often recorded by regularly sampling an audio waveform to create a sequence of digital samples (for example, using 48,000 samples per second) and grouping sets of these samples into processing units called frames (e.g., 64 samples per frame) for further processing such as digital compression encoding or packet-network transmission (such as Internet transmission). A receiver of the audio data will then reassemble the frames of audio that it has received, decode them, and convert the resulting sequence of digital samples back into sound using electro acoustic technology.

Proper recording and control of timing information is required for coordinating multiple streams of media samples, such as for synchronizing video and associated audio content. Even the use of media which does not exhibit a natural progression of samples through time will often require the use of timing information in a multimedia system. For example, if a stationary picture (such as a photograph, painting, or document) is to be displayed along with some audio (such as an explanatory description of the content or history of the picture), then the timing of the display of the stationary picture (an entity which consists of only one frame or sample in time) may need to be coordinated with the timing of the associated audio track.

Other examples of the usefulness of such timing information include being able to record the date or time of day at which a photograph was taken, or being able to specify editing or viewing points within media streams (e.g., five minutes after the camera started rolling).

In each of the above cases, a sample or group of samples in time of a media stream can be identified as a frame, or fundamental processing unit. If a frame consists of more than one sample in time, then a convention can be established in which the timing information represented for a frame corresponds to the time of some reference point in the frame such as the time of the first, last or middle sample.

In some cases, a frame can be further subdivided into even smaller processing units, which can be called fields. One example of this is in the use of interlaced-scan video, in which the sampling of alternating lines in a picture are separated so that half of the lines of each picture are sampled as one field at one instant in time, and the other half of the lines of the picture are then sampled as a second field a short time later. For example, lines 1, 3, 5, etc. may be sampled as one field of picture, and then lines 0, 2, 4, etc. of the picture may be sampled as the second field a short time later (for example $\frac{1}{50}^{th}$ of a second later). In such interlaced-scan video, each frame can be typically separated into two fields.

Similarly, one could view a grouping of 64 samples of an audio waveform for purposes of data compression or packet-network transmission to be a frame, and each group of eight samples within that frame to be a field. In this example, there would be eight fields in each frame, each containing eight samples.

In some methods of using sampled media streams that are well known in the art, frames or fields may consist of overlapping sets of samples or transformations of overlapping sets of samples. Two examples of this behavior are the use of lapped orthogonal transforms [1] Henrique Sarmento Malvar, *Signal Processing with Lapped Transforms*, Boston, Mass., Artech House, 1992; 2) H. S. Malvar and D. H. Staelin, "The LOT: transform coding without blocking effects," IEEE Transactions on Acoustics, Speech, and Signal Processing, vol. 37, pp. 553–559, April 1989; 3) H. S. Malvar, Method and system for adapting a digitized signal processing system for block processing with minimal blocking artifacts, U.S. Pat. No. 4,754,492, June 1988.] and audio redundancy coding [1) J. C. Bolot, H. Crepin, A. Vega-Garcia: "Analysis of Audio Packet Loss in the Internet", Proceedings of the 5th International Workshop on Network and Operating System Support for Digital Audio and Video, pp. 163–174, Durham, April 1995; 2) C. Perkins, I. Kouvelas, O. Hodson, V. Hardman, M. Handley, J. C. Bolot, A. Vega-Garcia, S. Fosse-Parisis: "RTP Pyaload for Redundant Audio Data", Internet Engineering Task Force Request for Comments RFC2198, 1997.]. Even in such cases it is still possible to establish a convention by which a time is associated with a frame or field of samples.

In some cases, the sampling pattern will be very regular in time, such as in typical audio processing in which all samples are created at rigidly-stepped times controlled by a precise clock signal. In other cases, however, the time between adjacent samples in a sequence may differ from location to location in the sequence.

One example of such behavior is when sending audio over a packet network with packet losses, which may result in some frames not being received by the decoder while other frames should be played for use with their original relative timing. Another example of such behavior is in low-bit-rate videoconferencing, in which the number of frames sent per second is often varied depending on the amount of motion in the scene (since small changes take less data to send than large changes, and the overall channel data rate in bits per second is normally fixed).

If the underlying sampling structure is such that there is understood to be a basic frame or field processing unit sampling rate (although some processing units may be skipped), then it is useful to be able to identify a processing unit as a distinct counting unit in the time representation. If this is incorporated into the design, the occurrence of a skipped processing unit may be recognized by a missing value of the counting unit (e.g., if the processing unit count proceeds as 1, 2, 3, 4, 6, 7, 8, 9, . . . , then it is apparent that count number 5 is missing).

If the underlying sampling structure is such that the sampling is so irregular that there is no basic processing unit sampling rate, then what is needed is simply a good representation of true time for each processing unit. Normally however, in such a case there should at least be a common time clock against which the location of the processing unit can be referenced.

In either case (with regular or irregular sampling times), it is useful for a multimedia system to record and use timing information for the samples or frames or fields of each processing unit of the media content.

Different types of media may require different sampling rates. But if timing information is always stored with the same precision, a certain amount of rounding error may be introduced by the method used for representing time. It is desirable for the recorded time associated with each sample to be represented precisely in the system with little or no such rounding error. For example, if a media stream operates at 30,000/1001 frames per second (the typical frame rate of North American standard NTSC broadcast video—approximately 29.97 frames per second) and the precision of the time values used in the system is to one part in $10^{-6}$ seconds, then although the time values may be very precise in human terms, it may appear to processing elements within the system that the precisely-regular sample timing (e.g. 1001/30,000 seconds per sample) is not precisely regular (e.g. 33,366 clock increment counts between samples, followed by 33,367 increments, then 33,367 increments, and then 33,366 increments again). This can cause difficulties in determining how to properly handle the media samples in the system.

Another problem in finding a method to represent time is that the representation may "drift" with respect to true time as would be measured by a perfectly ideal "wall clock". For example, if the system uses a precisely-regular sample timing of 1001/30,000 seconds per sample and all samples are represented with incremental time intervals being 33,367 increments between samples, the overall time used for a long sequence of such samples will be somewhat longer than the true time interval—a total of about one frame time per day and accumulating more than five minutes of error after a year of duration.

Thus, drift is defined as any error in a timecode representation of sampling times that would (if uncorrected) tend to increase in magnitude as the sequence of samples progresses.

One example of a method of representing timing information is found in the SMPTE 12M design [Society of Motion Picture and Television Engineers, Recommended Practice 12M: 1999] (hereinafter called "SMPTE timecode"). SMPTE timecodes are typically used for television video data with timing specified in the United States by the National Television Standards Committee (NTSC) television transmission format, or in Europe, by the Phase Alternating Line (PAL) television transmission format.

Background on SMPTE Timecode

SMPTE timecode is a synchronization signaling method originally developed for use in the television and motion picture industry to deal with video tape technology. The challenge originally faced with videotape was that there was no "frame accurate" way to synchronize devices for video or sound-track editing. A number of methods were employed in the early days, but because of the inherent slippage and stretching properties of tape, frame accurate synchronization met with limited success. The introduction of SMPTE timecode provided this frame accuracy and incorporated additional functionality. Additional sources on SMPTE include "The Time Code Handbook" by Cipher Digital Inc. which provides a complete treatment of the subject, as well as an appendix containing ANSI Standard SMPTE 12M-1986. Additionally, a text entitled "The Sound Reinforcement Handbook" by Gary Davis and Ralph Jones for Yamaha contains a section on timecode theory and applications.

The chief purpose of SMPTE timecode is to synchronize various pieces of equipment. The timecode signal is formatted to provide a system wide clock that is referenced by everything else. The signal is usually encoded directly with the video signal or is distributed via standard audio equipment. Although SMPTE timecode uses many references from video terminology, it is sometimes also used for audio-only applications.

In many applications, a timecode source provides the signal while the rest of the devices in the system synchronize to it and follow along. The source can be a dedicated timecode generator, or it can be (and often is) a piece of the production equipment that provides timecode in addition to its primary function. An example of this would be a multitrack audio tape deck that is providing timecode on one track and sound for the production on other tracks. Video tape often makes similar use of a cue track or one of its audio sound tracks to record and play back timecode.

In other applications, namely video, the equipment uses timecode internally to synchronize multiple timecode sources into one. An example would be a video editor that synchronizes with timecode from a number of prerecorded scenes. As each scene is combined with the others to make the final product, their respective timecodes are synchronized with new timecode being recorded to the final product.

SMPTE Time Address

SMPTE timecode provides a unique address for each frame of a video signal. This address is an eight digit number, based on the 24 hour clock and the video frame rate, representing Hours, Minutes, Seconds and Frames in the following format:

HH:MM:SS:FF

The values of these fields range from 00 to 23 for HH, 00 to 59 for MM, 00 to 59 for SS, and 00 to 24 or 29 for FF (where 24 is the maximum for PAL 25 frame per second video and 29 is the maximum for NTSC 30,000/1001 frame per second video). By convention, the first frame of a day is considered to be marked as 00:00:00:01 and the last is 00:00:00:00 (one frame past the frame marked 23:59:59:24 for PAL and 23:59:59:29 for NTSC). This format represents a nominal clock time, the nominal duration of scene or program material and makes approximate time calculations easy and direct.

SMPTE Frame Rate

The Frame is the smallest unit of measure within SMPTE timecode and is a direct reference to the individual "picture" of film or video. The rate is the number of times per second that pictures are displayed to provide a rendition of motion. There are two standard frame rates (frames/sec) that typically use SMPTE timecode: 25 frames per second and 30,000/1001 frames per second (approximately 29.97 frames per second). The 25 frame per second rate is based on European video, also known as SMPTE EBU (PAL/SECAM color and b&w). The 30,000/1001 frame per second rate (sometimes loosely referred to as 30 frame per second) is based on U.S. NTSC color video broadcasting. Within the 29.97 frame per second use, there are two methods of using SMPTE timecode: "Non-Drop" and "Drop Frame".

The Frames figure advances one count for every frame of film or video, allowing the user to time events down to ½sth, or $100\frac{1}{30,000}$th of a second. SMPTE timecode is also sometimes used for a frame rate of exactly 30 frames per second. However, the user must take care to distinguish this use from the slightly slower 30,000/1001 frames per second rate of U.S. NTSC color broadcast video. (The adjustment factor of 1000/1001 originates from the method by which television signals were adjusted to provide compatibility between modern color video and the previous design for broadcast of monochrome video at 30 frames per second.)

Thus, the SMPTE timecode consists of the recording of an integer number for each of the following parameters for a video picture: Hours, Minutes, Seconds, and Frames. Each increment of the Frames number is understood to represent an increment of time of 1001/30,000 seconds in the NTSC system and 1/25 seconds in the PAL system.

However, since the number of frames per second in the NTSC system (30,000/1001) is not an integer, there is a problem of drift between the SMPTE 12M timecode representation of time and true "wall clock" time. This drift can be greatly reduced by a special frame counting method known as SMPTE "drop frame" counting. Without SMPTE drop frame counting, the drift between the SMPTE timecode's values of Hours, Minutes, and Seconds and the value measured by a true "wall clock" will accumulate more than 86 seconds of error per day. When using SMPTE drop frame counting, the drift accumulation magnitude can be reduced by about a factor of about 1,000 (although the drift is still not entirely eliminated and the remaining drift is still more than two frame sampling periods).

The SMPTE timecode has been very widely used in the video production industry (for example, it is incorporated into the design of many video tape recorders). It is therefore very useful if any general media timecode design is maximally compatible with this SMPTE timecode. If such compatibility can be achieved, this will enable equipment designed for the media timecode to work well with other equipment designed specifically to use the SMPTE timecode.

Within this document, the following terminology is used. A timecode comprises the data used for representing the time associated with a media sample, frame, or field. It is useful to separate the data of a timecode into two distinct types: the timebase and the timestamp. The timestamp comprises the information which is used to represent the timing for a specific processing unit (a sample, frame, or field). The timebase comprises the information that establishes the basis of the measurements units used in the timestamp. In other words, the timebase is the information necessary to properly interpret the timestamps. The timebase for a media stream normally remains the same for the entire sequence of samples, or at least for a very large set of samples.

For example, we may interpret the SMPTE timecode as having a timebase that consists of:

Knowledge of (or an indication of) whether the system is NTSC or PAL, and

Knowledge of (or an indication of) whether or not the system uses SMPTE "drop frame" counting in order to partially compensate for drift.

Given this, the timestamps then consist of the representations of the parameters Hours, Minutes, Seconds, and Frames for each particular video frame.

This invention arose out of concerns associated with providing improved timing systems, methods and structures associated with various media. The invention also arose out of concerns associated with providing improved timing systems, methods and structures that are compatible with timecodes in current use, and, in particular, SMPTE timecodes.

SUMMARY

Timecoding systems, methods and data structures are described which, in some embodiments, permit a true time to be ascertained from media samples whose timecodes contain an amount of drift which can arise from having non-integer frame rates. Inventive methods incorporate the use of an offset parameter that describes a time difference between a timecode and a true time associated with a media sample. The inventive approaches can be incorporated with and used compatibly in connection with current timecoding paradigms such as SMPTE and the like. Further embodiments permit timecoding to take place at the field level of a frame. This can permit true-time calculations to be done to ascertain the true time associated with individual fields of a frame.

In addition, other embodiments provide novel counting compensation methods that are directed to reducing the drift that can be associated with media samples that are sampled at non-integer frame rates.

BRIEF DESCRIPTION OF THE DRAWINGS

FIG. 1 illustrates an exemplary timecode counter having seconds and frames parameters.

FIG. 2 illustrates an exemplary timecode counter having offset, seconds and frames parameters.

DETAILED DESCRIPTION

Overview

Figure 3:
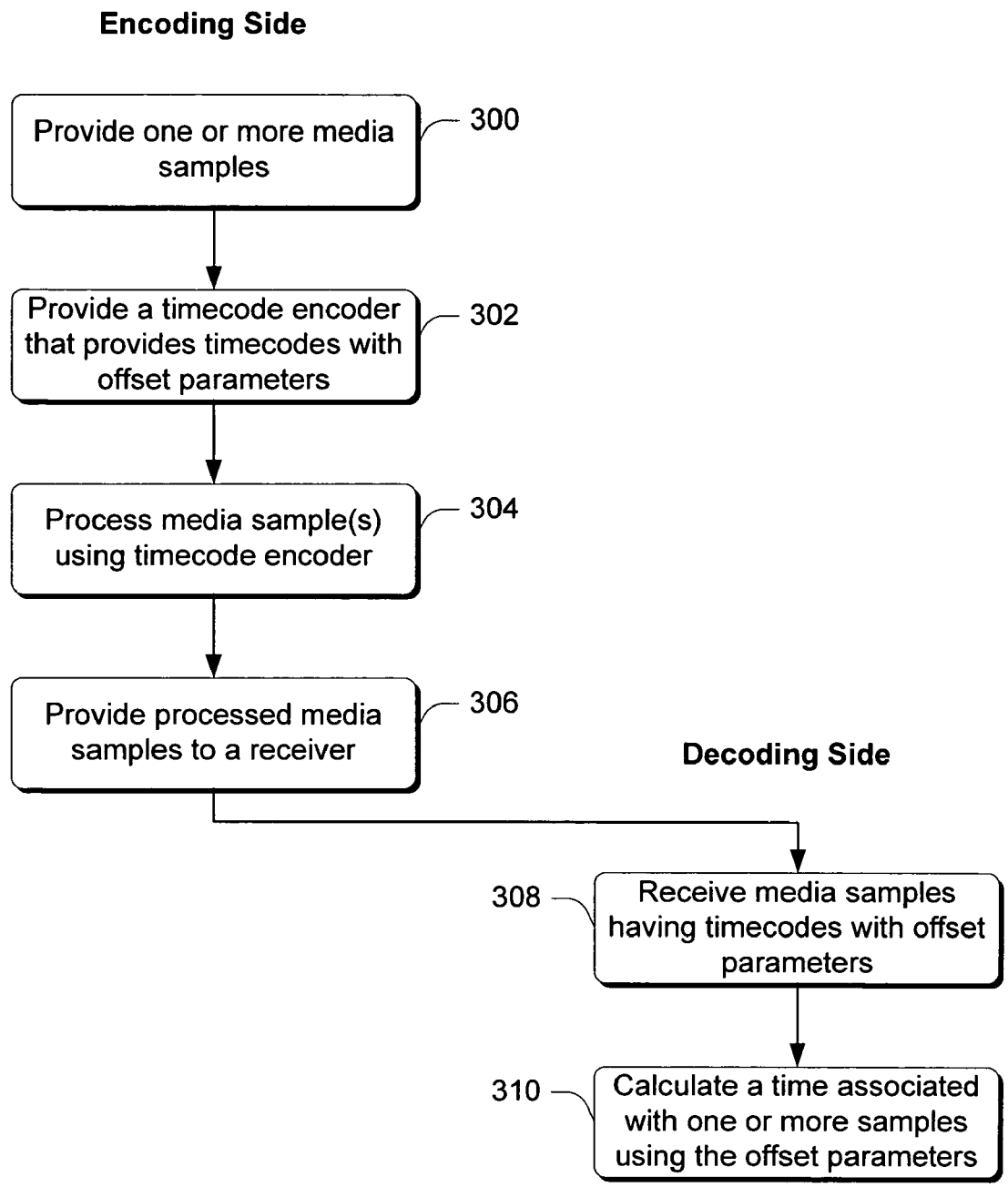
FIG. 3 is a flow diagram that describes steps in a method in accordance with one embodiment.

Timing systems, methods and structures for use with various media are described. Various embodiments provide a means by which an accurate reference to "true time" can be provided in a timecode associated with a media sample. Various embodiments described below incorporate an offset parameter that can be used in conjunction with existing timecodes to ascertain the true time associated with a particular sample, frame or field.

The description below starts first with an explanation of an exemplary timebase in accordance with one embodiment, and then an explanation of exemplary timestamp parameters associated with one inventive embodiment.

Timebase Parameters for a Timecode Design

Table 1 shows an exemplary full set of parameters used in one design for specifying a timebase for use in a timecode in accordance with one embodiment.

Some of these parameters can be specified only in a header, or can be fixed to specific values for a particular system design. Alternatively, some or all of these parameters can be sent with every timestamp. (If field-based timecodes are not needed in the system, the BaseFPF parameter can be removed and can have an implied value of 1.)

TABLE 1

Timecode Timebase Parameters

| Parameter Name | Parameter Type | Size (bits) | Range of Values |
|---|---|---|---|
| MaxDays | int | 1 or more | >0 |
| BaseUPS | int | 16 or more | >0 |
| BaseUPF | int | 16 or more | >0 |
| BaseFPF | int | 2 or more | >0 |
| CountComp | enum | 2 or more | '00', '01', '10', '11' |

Using these parameters, an important derived parameter is defined as follows:

$$\text{Max}FPS = \text{ceil}(\text{Base}UPS/(\text{Base}FPF \cdot \text{Base}UPF)),$$

where ceil(x) is defined as a mathematical function of an argument x, which, for non-negative values of x, is equal to x if x is an integer and is otherwise equal to the smallest integer greater than x.

The parameters shown in Table 1 and the MaxFPS parameter are defined semantically as follows:

MaxDays: The maximum number of days for which the timecode period is defined.

BaseUPS: The number of basic units of time (termed clock ticks) in the timebase per second (e.g., 120,000 ticks per second or 50 ticks per second). This parameter can have a general integer value. This parameter can also be defined as a specific fixed integer constant divided by a general integer value. The integer constant can be an integer multiple of 30,000. This parameter can also have one or more values, at least one of which is an integer multiple of 30,000.

BaseUPF: The number of basic units of time (termed clock ticks) to be added for each field count increment (e.g., 2,002 ticks per field or 1 tick per field). This parameter can have a general integer value. This parameter can also have one or multiple values at least one of which is in integer multiple of 1001.

BaseFPF: The number of fields defined for each frame (e.g., 2 fields per frame in interlaced video, or 1 field per frame in progressive-scan video). If media samples are not each divided into an equal number of fields, the BaseFPF parameter is 1. This parameter can have a general integer value.

CountComp: Indicates the method applied to compensate frame counting increments to reduce or eliminate drifts over time between true "wall clock" time and the timecode timestamps. Such is defined as:

'00': No counting compensation. Drift, if any, is accumulated in the Offset parameter of the timecode. The Frames parameter simply counts up from 0 to MaxFPS-1 and then starts again at 0.

'01': SMPTE "drop frame" counting compensation. As the timestamps for consecutive frames increment past each one-minute mark, the Frames parameter counting starts at 2 rather than 0, except for minutes numbered 00, 10, 20, 30, 40, and 50. The Frames parameter always counts up to MaxFPS-1. Any drift remaining after performing this compensation is accumulated in the Offset parameter.

'10': "Top-drop" counting compensation. In order to eliminate drift over time, the Frames parameter will sometimes count up from 0 to MaxFPS-1 and will sometimes count up only from 0 to MaxFPS-2 (dropping the top count). Top-drop counting compensation is probably the most intuitive method—for example, if the basic frame rate is 7.3 frames per second, then sometimes there will be seven frames counted in a second and sometimes eight (so the Frames count will sometimes count from 0 up to 6 and sometimes up to 7).

'11': "Bottom-drop" counting compensation. In order to eliminate drift over time, the Frames parameter will sometimes count up from 0 to MaxFPS-1 and sometimes will sometimes count up only from 1 to MaxFPS-1 (dropping the bottom count). This counting method is similar to that of top-dropping, but in this case it is the Frames parameter value of 0 that is skipped rather than the highest value of the Frames parameter.

CountComp shall be equal to '00' if BaseUPS/(BaseFPF·BaseUPF) is an integer (as no drift accumulates in this case). CountComp shall not be equal to '01' or '11' if BaseUPS/(BaseFPF·BaseUPF) is less than one (since the Frames parameter cannot exceed 0 in this case). Further information on the use of CountComp is provided below.

Timestamp Parameters for the Timecode Design

Table 2 shows an exemplary full set of parameters of a specific timestamp using the timebase defined by Table 1 above. Some of these parameters could be specified only in a header, or could be fixed to specific values for a particular system design. It may also be desirable in some system designs to send some parameters more often than others, depending on the receiver to store or infer values for some of the unsent parameters. (If field-based timecodes are not needed in the system, the Fields parameter can be removed and have an implied value of 0.)

TABLE 2

Timecode Timestamp Parameters

| Parameter Name | Parameter Type | Size (bits) | Range of Values |
|---|---|---|---|
| Discont | enum | 2 | '00', '01', '10', '11' |
| Hours | int | 5 or more | 0 to 24 · MaxDays-1 |
| Minutes | int | 7 or more | −59 to 59 |
| Seconds | int | 7 or more | −59 to 59 |

TABLE 2-continued

Timecode Timestamp Parameters

| Parameter Name | Parameter Type | Size (bits) | Range of Values |
|---|---|---|---|
| Frames | int | 7 or more | 0 to MaxFPS-1 |
| Fields | int | 1 or more | 0 to BaseFPF-1 |
| Offset | int | 16 or more | any integer value |

Conversion to true (real-number-valued) "wall-clock" time in seconds, using the information in the above tables, can be defined as follows:

$$t = 60 \cdot (60 \cdot Hours + Minutes) + Seconds + (BaseUPF \cdot (BaseFPF \cdot Frames + Fields) + Offset)/BaseUPS$$

This timecode definition can be extended in a straightforward fashion so that rather than using only Hours and MaxDays to specify its maximum range, the timestamp definition would also specify a Day parameter and Hours would be restricted to a range of 0 to 23. Or the timecode could even include a DayOfMonth, Month, and Year, and the timebase could specify (implicitly or explicitly) the range of the Year parameter. However, this last type of definition becomes more complex because it begins to bring into question how to account for leap days, leap seconds, etc.

A discontinuity is a juncture between two consecutive samples for which the difference between the time values represented for each of the two samples cannot be interpreted as a correct representation of the true time interval between these samples. (This is useful to indicate when splicing streams together without altering timecode values.)

The parameters shown in Table 2 are defined semantically as follows:

Discont: Specifies whether there is a discontinuity at the boundary between a specific sample and an adjacent sample. This parameter is useful to include for editing purposes, as it allows splicing of two streams of media samples, each of which has its own timestamps. Defined by the following:
  '00': No discontinuity indicated (unless indicated on adjacent sample timecodes),
  '01': Discontinuity between this sample and next sample,
  '10': Discontinuity between previous sample and this sample,
  '11': Discontinuities between previous, current, and next samples.

Alternatively, the Discont parameter could be a single bit, along with a convention that a value of '1' indicates a discontinuity between the previous sample and the current sample (or a convention that it indicates a discontinuity between the previous sample and the next one).

Hours: An integer parameter which, when multiplied by 3,600, specifies an amount of time (in seconds) to be added as a component of the timestamp.

Minutes: An integer parameter which, when multiplied by 60, specifies an amount of time (in seconds) to be added as a component of the timestamp.

Seconds: An integer parameter which specifies a number of seconds of time to be added as a component of the timestamp.

Frames: An integer parameter which, when multiplied by BaseUPF and BaseFPF and divided by BaseUPS, specifies an amount of time (in seconds) to be added as a component of the timestamp. The Frames parameter is incremented for each media sample frame, set to zero if the incremented value exceeds MaxFPS-1, and is adjusted for drift as indicated by the CountComp parameter. The Frames parameter shall not exceed MaxFPS-1.

Fields: An integer parameter which, when multiplied by BaseUPF and divided by BaseUPS, specifies an amount of time (in seconds) to be added as a component of the timestamp. The Fields parameter is incremented for each media sample field and is set to zero if the incremented value exceeds MaxFPS-1.

Offset: An integer parameter which, when divided by BaseUPS, specifies an amount of time (in seconds) to be added as a component of the timestamp. The Offset parameter is used to specify the precise difference between the time represented by the other parameters and the true "wall clock" time of the media field sample.

Frame Rate Counting Compensation

Whenever a media sample rate in frames per second is not an integer (i.e., whenever BaseUPS/(BaseFPF·BaseUPF)) is not an integer, there may arise a need to adjust for drift between the Hours, Minutes, and Seconds parameters and the Frames count as the sampling sequence progresses. The Offset parameter can be used to account for some amount of drift, but there are two problems with using the Offset parameter for that purpose:

If too much drift is allowed to accumulate, the range of values that can be represented by the Offset parameter may be exceeded, and If too much drift is allowed to accumulate, the Hours, Minutes, and Seconds parameters begin to lose their normal interpretation as the approximate placement of the sample in normal "wall-clock" time.

The CountComp parameter indicates how the counting process is compensated for drift.

If we define a variable called Drift that contains the value of Offset needed to represent the accumulated drift, we can then specify the counting process as it relates to the CountComp variable. The value of Offset can be set equal to Drift if no alteration of this basic sampling timing is to be indicated. (However, Offset can be set to some value other than Drift if desired in order to indicate a different timing of samples—two examples of which are provided below).

The counting process and drift compensation for each increment of the Fields parameter can then be defined by the following C++ process definition. If some field sample is skipped (not sent), the Fields parameter of the subsequent sample is incremented one additional time to indicate the gap in time from the missing sample. In the following C++ code fragment, it is assumed that all parameters are processed using arbitrarily long integer variables (i.e., a parameter may temporarily take on a value in excess of its stated range in the tables):

```
++Fields;          // Increment the Fields parameter
if(Fields == BaseFPF)
{                             // Max Fields value exceeded
  Fields = 0;                 // Indicate first field of next frame
  ++Frames;                   // Increment the frame count
  adj = 0;                    // Drift adjustment
  if(CountComp == 0x0)
  {                           // No counting compensation
    if(Frames == MaxFPS)
    {
      Frames = 0;
```

```
          for(adj=MaxFPS*BaseFPF*BaseUPF; adj >= BaseUPS;
              adj -=BaseUPS)
              if(++Seconds == 60)
              {                    // adjust Hours, Minutes, Seconds
                  Seconds = 0;
                  if(++Minutes == 60)
                  {
                      Minutes = 0;
                      if(++Hours == MaxDays)
                          Hours = 0;
                  }
              }
      }
  }
  else if(CountComp == 0x1)
  {                      // SMPTE Drop-Frame Compensation
      if(Frames == MaxFPS)
      {
          adj = MaxFPS*BaseFPF*BaseUPF - BaseUPS;
          Frames = 0;
          if(++Seconds == 60)
          {
              Seconds = 0;
              if((++Minutes % 10) != 0)
              {
                  Frames = 2;
                  adj -= 2*BaseFPF*BaseUPF;
              }
              if(Minutes == 60)
              {
                  Minutes = 0;
                  if(++Hours == MaxDays)
                      Hours = 0;
              }
          }
      }
  }
  else if(CountComp == 0x2)
  {                      // Top-Drop Compensation
      if((Frames >= MaxFPS-1) &&
         ((Frames == MaxFPS) ||
          (Frames*BaseFPF*BaseUPF+Drift > BaseUPS)))
      {
          for(adj=Frames*BaseFPF*BaseUPF;
              adj+Drift >= BaseUPS;
              adj-=BaseUPS)
              if(++Seconds == 60)
              {
                  Seconds = 0;
                  if(++Minutes == 60)
                  {
                      Minutes = 0;
                      if(++Hours == MaxDays)
                          Hours = 0;
                  }
              }
          Frames = 0;
      }
  }
  else if(CountComp == 0x3)
  {                      // Bottom-Drop Compensation
      if(Frames == MaxFPS)
      {
          adj = MaxFPS*BaseFPF*BaseUPF - BaseUPS;
          if(++Seconds == 60)
          {
              Seconds = 0;
              if(++Minutes == 60)
              {
                  Minutes = 0;
                  if(++Hours == MaxDays)
                      Hours = 0;
              }
          }
          if(adj+Drift >= BaseFPF*BaseUPF)
          {
              adj -= BaseFPF*BaseUPF;
              Frames = 1;
          }else
```

```
              Frames = 0;
          }
      }
      Drift += adj;
  }
```

Other similar methods of counting compensation may be defined as methods based on a calculation of the accumulated drift between the time represented in the Hours, Minutes, Seconds, and Frames parameters and the true "wall clock" time of a frame, and skipping over some frame count or counts when the accumulated drift exceeds some threshold value of at least BaseFPF·BaseUPF in value.

EXAMPLE 1

The following example is given in the context of NTSC (approximately 29.97 frames per second) with SMPTE Non-drop Counting.

A SMPTE NTSC non-drop timecode can be represented in the timecode data structure fields of CountComp, Hours, Minutes, Seconds, and Frames without substantial alteration. The other parameters of the timecode should be specified as:

MaxDays=1;
CountComp='00'; (no counting compensation)
BaseUPF=1001;
BaseUPS=30000 (for frame-based timestamps), or 60000 (field-based);
BaseFPF=1 (for frame-based timestamps), or 2 (field-based);
Fields=0 (for frame-based timestamps), or 0 or 1 (field-based);

The Offset parameter should be set to the value of Drift as computed by the section entitled "Frame Rate Counting Compensation". (Initially set to zero, then incremented by 30 (frame-based) or 60 (field-based) each time the value of Seconds increments.)

Note that the SMPTE timecode can then later be extracted directly from the CountComp, Hours, Minutes, Seconds, and Frames parameters, as its parameter values have been preserved without alteration.

As an example, consider the following:

The United States system for video was originally designed to be 30 frames/sec. But, due to advancements in video technology (i.e. the invention of color television), this was changed slightly. This frame rate was changed by a factor of 1001/1000. So now, the number of frames in one second of US standard video is 30,000/1001 or ~29.97 (hence, the 29.97 framers per second number above).

This means that if there are timecodes that are counting or are labeled hours, minutes, seconds, and frames, then if you just count from 0–29 repetitively, after some amount of time has passed by, there will be a drift between the time that the timecode seems to represent, and the true time or time lapse between one frame and some other sample that arrives much later. When there are 30 f/s (frames/sec), there is a significant drift that accumulates between the true time that you would measure with an accurate clock and what the timecode is representing in terms of hours, minutes, and seconds and frames.

Consider FIG. 1 which shows an exemplary timecode counter 100 with a "seconds" column and a "frames" column. The "seconds" column represents a measure of time in seconds. The "frames" column represents a measure of counted frames. ("Hours" and "Minutes" have been eliminated for simplicity in this example). The true time lapse represented by a frame count is 1001/30,000 sec/frame. The timecode starts at 0—with the hours, minutes, and seconds being 0. The frame count is 1. As the individual frames pass by (for example in a timecode encoder), they are counted and can be assigned a timestamp. The first frame in this example would be assigned a timestamp of (s=0, f=1) for (seconds, frame). In the next increment, the seconds are still 0, but the frame count is now 2, i.e. (s=0, f=2). Because there are a non-integer number of frames in one second, drift will begin to accumulate in the timestamp.

As the frames are counted up, the frame counter will count up to 29 and then roll over so that s=1 and f=0. Consider that the nominal time lapse between s=0 and f=0 and s=1, f=0 should ideally be one second. This is not, however, the case. What has happened is that there have been 30 increments of 1001/30,000 or 30,001/30,000 seconds, which is slightly longer than 1 second. Thus, the actual time interval that has elapsed is slightly longer than what you see from the timestamp parameters. Thus, the point where s=1, f=0 actually occurs after 30,030/30,000 seconds of time have elapsed. The difference of 30/30,000 seconds is the drift for which the use of an offset can compensate.

In the presently-described embodiment, it is very desirable to have an understanding of how much time lapse is indicated by an increment of the frame counter. There is an understanding of how many units per second there are in the counting clock. In the present case, we are counting in units of 1/30,000 of a second. This value is expressed by the UPS (units per second) parameter above. Accordingly, the UPS parameter is set to 30,000. Now, one can determine how much time lapse is indicated in these units by an increment of the frame counter. This value is expressed by the UPF parameter. In this example, the UPF parameter is 1001. That is, there are 1001 units of 1/30,000 sec that pass each time the frame counter increments. So, an increment of the frame counter is associated with 1001/30,000 seconds.

Given these two parameters, the true time lapse can be ascertained by multiplying the frame count by UPF/UPS. That is:

(frame count)×(*UPF/UPS*)=true time lapse indicated by frame count.

In the first interval (where s=0), you can calculate the true time by taking the seconds parameter, and then adding to it (frame count)×(UPF/UPS). That is, True time=*s*+(frame count)×(*UPF/UPS*), where *s*=0

When the system rolls over into the next second (i.e. s=1), this calculation is no longer valid. This is because you have to account for the difference in time that has lapsed due the association of a non-integer frame rate with an integer counter. This is where, in this example, the use of the offset parameter comes into play.

FIG. 2 shows an exemplary timecode counter 200 with a "seconds" column, a "frames" column, and an offset column. In the example that follows, the particular values that are used for the offset parameter are associated with a specific non-integer frame rate. As frame rates change, so too can the specific values of the offset parameter. Thus, it is to be appreciated and understood that the described examples constitute specific solutions to specific circumstances. Accordingly, the claimed subject matter should not be construed to cover only those specific examples, except, if and when specified.

The offset parameter is also in the same units (units per second) so that you reference to the same clock. The offset parameter is initially set to 0. When the seconds counter rolls over to its next value (i.e. 1), the offset parameter is incremented by 30. A formula to calculate true time is now given as:

True time=*s*+(frame count×*UPF*+offset)/*UPS*

So, calculating the true time when s=1, f (frame count)=0, and offset=30 gives: 1+(0+30/30,000)=30,030/30,000 seconds. Now, by adding the offset parameter, you are able to use the traditional counting method (SMPTE timecode), but you are also able to calculate a precise time associated with the sample.

The offset is selected as a function of the true frame rate. Recall that the true frame rate is typically some fractional number of frames per second. The inverse of this is the number of seconds/frame.

As the above example proceeds through the seconds, you will get to a point where s=2, f=0. Here, you increment the offset by another 30 so that it becomes 60. Effectively, the offset increases as more and more time goes by. In each case, though, what the offset is doing is telling you is how to get from the parameters that you have in the traditional SMPTE timecode to a true time associated with that sample.

Application of the inventive techniques should not, however, be limited only to cases where there is a fractional frame rate. Specifically, if there is an integer number of frames in a second (e.g. in the European system there are 25 frames/sec.), then the offset can always just be 0 because there will not be any drift. However, the ability to use an offset to indicate a time that may differ from the nominal time represented in the SMPTE timecode also has other uses, such as, for example, providing the ability to indicate that the sampling of the original samples differs from the timing indicated by the nominal time represented in the SMPTE timecode.

To a large extent, the problem associated with old style timecodes, such as SMPTE, is that there is not a clear understanding of where true time is relative to the clock associated with the timecode. Using the principles described above, an offset parameter is provided and can be used to ascertain the true time associated with individual frames, or, as we will see below, portions of frames.

FIG. 3 is a flow diagram that describes steps in a method in accordance with one described embodiment. The method can be implemented in any suitable hardware, software, firmware, or combination thereof. In the illustrated example, the method is implemented in software.

Step 300 provides one or more media samples. The media samples can be any suitable media samples. In addition, the media samples can be provided in any suitable format. For example, the media samples can comprise frames or fields, to name just two. Step 302 provides a timecode encoder that is configured to provide timecodes with offset parameters. As described above, the use of the offset parameter is advantageous in that it enables old timecodes that do not have an accurate understanding of true time to be used and, in a sense, retrofitted with a parameter that can be used to ascertain from the old timecode data, the true time associated with the sample.

Step 304 processes the media samples using the timecode encoder. This step can be implemented by providing one or more of the samples with timecodes having the offset parameter. Once the samples are processed, step 306 provides the media samples to a receiver. This step can be implemented in any suitable way and need not, necessarily, be implemented at the same time the timecodes are provided on the media samples. For example, the timecodes might be provided when a particular movie is initially produced. Step 306 might be implemented when the movie is distributed to various entities that might be interested in receiving the movie, i.e. editors, vendors, and the like.

Step 308 receives the media samples having the timecodes with the offset parameters. This step can be implemented in any suitable manner. For example, this step might be implemented by providing the media samples to an editor that is interested in editing the samples. Step 310 calculates a time associated with one or more samples using the offset parameter. The time that is calculated is desirably one that is free from drift.

Figure 4:
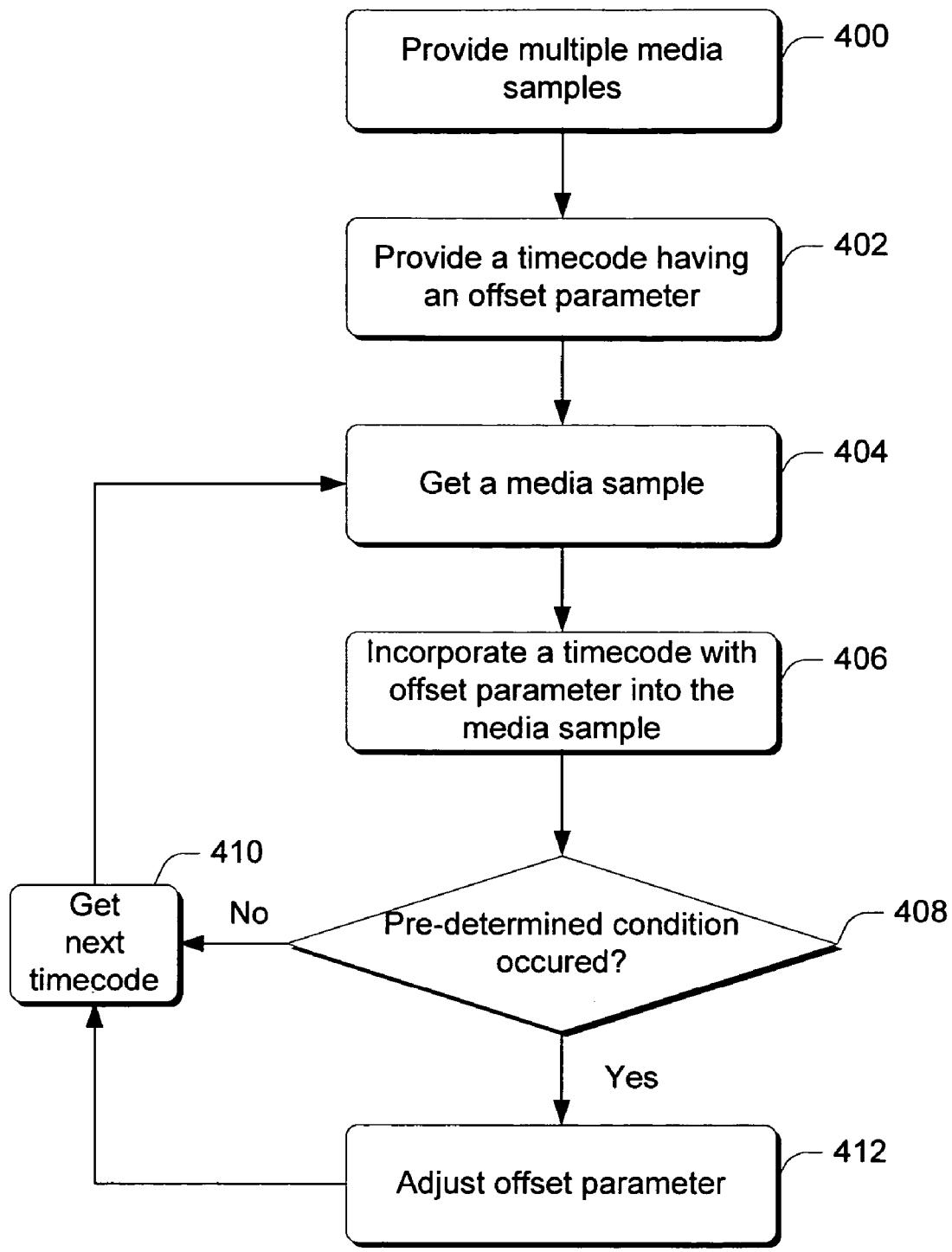
FIG. 4 is a flow diagram that describes steps in a method in accordance with one embodiment.

FIG. 4 is a flow diagram that describes one method of providing offset parameters in a timecode. The method described below is, in some respects, an embellishment of step 304. Step 400 provides multiple media samples. Step 402 provides a timecode having an offset parameter. Step 404 gets a first media sample. Step 406 then incorporates a timecode with an offset parameter into the media sample. Step 408 determines whether a pre-determined condition has occurred. Any suitable condition can be used. In the above example, the condition was associated with whether the seconds counter in the timecode turned over. In some examples below, a pre-determined condition occurs if a determined number of frames are dropped.

If step 408 determines that the condition has not occurred, then step 410 gets the next timecode (which may or may not include the offset parameter) and returns to step 404. If, on the other hand, step 408 determines that the condition has occurred, step 412 adjusts the offset parameter and returns to step 410 to get the next timecode. Adjusting the offset parameter can take place in any suitable way, given the specific type of media that is being processed. In the above example, the offset parameter was adjusted by incrementing it a predetermined amount. It is possible, in some situations, for the offset parameter to be decremented. An example of this is given below.

Once the offset parameter has been adjusted, step 410 gets the next timecode (which preferably includes the adjusted offset parameter) and returns to step 404.

In this manner, multiple media samples can be provided with offset parameters which can be used to ascertain a time measure associated with the sample. This time measure can desirably be a more accurate time measure than is associated with a timecode that, because of its association with a non-integer frame rate, necessarily includes some drift.

EXAMPLE 2

The following example is given in the context of NTSC (approximately 29.97 frames per second) with SMPTE Drop Counting.

US NTSC color video runs at approximately 29.97 frames/sec. If synchronized with program material at 30 frames/sec, there is an extra 0.03 frames every second, adding up to 3.6 seconds every hour or 108 extra frames. Drop Frame timecode was developed to reduce this drift that can cause synchronization problems. It does this by "dropping" certain specific timecodes in the sequence of timecodes. The adjustment method used in SMPTE Drop Frame timecode was to drop two timecode values each minute except for every tenth minute (minutes 00, 10, 20, 30, 40, 50). An example would be that 01:22:59:29 advances directly to 01:23:00:02, rather then first advancing to 01:23:00:00, then 01:23:00:01, and then 01:23:00:02. Codes 01:23:00:00 and 01:23:00:01 are dropped. This allows the timecode to run much closer to true time over significant periods.

A SMPTE NTSC drop-frame timecode can be represented in the timecode data structure fields of CountComp, Hours, Minutes, Seconds, and Frames without substantial alteration. The other parameters of the timecode should be specified as:
MaxDays=1;
CountComp='01' (SMPTE drop-frame counting);
BaseUPF=1001;
BaseUPS=30000 (for frame-based timestamps), or 60000 (field-based);
BaseFPF=1 (for frame-based timestamps), or 2 (field-based);
Fields=0 (for frame-based timestamps), or 0 or 1 (field-based);

The Offset parameter should then be set to the value of Drift as computed by the C++ code above (i.e. initially set to zero, then incremented by 30 (frame-base) or 60 (field based) each time the value of Seconds increments, unless this occurs along with two frame count drops at temporal locations as indicated in the pseudo-C code above, in which case it should be decremented by 1972 (frame-based) or 3944 (field-based) instead).

Note that the SMPTE timecode can then later be extracted directly from the CountComp, Hours, Minutes, Seconds, and Frames parameters, as its parameter values have been preserved without alteration.

Essentially then, determining the offset parameter in drop frame counting operates in much the same way as the example above, except that the offset parameter is adjusted to compensate for the dropped values. Specifically, every time the seconds counter rolls over to the initial count (i.e. from 29 to 0), the offset is incremented by 30. There is, however, a specific rule for adjusting the offset parameter when the dropped values occur. Specifically, when the frame counts are skipped, instead of incrementing the offset by 30, it is decremented by a predetermined value which, in this case is 1972.

The value that is used for decrementing the offset parameters is determined as follows. When the seconds counter rolls over, you would normally add 30. You have to compensate, however, for the fact that two frame counts have been dropped. This constitutes a negative offset of 2002/30,000. Thus, 2002−30=1972—the predetermined value.

EXAMPLE 3

The following example is given in the context of PAL (50 fields per second) with SMPTE Timecode. A SMPTE PAL timecode can be represented in the timecode data structure fields of CountComp, Hours, Minutes, Seconds, and Frames without substantial alteration. The other parameters of the timecode should be specified as:
MaxDays=1;
CountComp='00'; (no counting compensation)
BaseUPF=1;
BaseUPS=25 (for frame-based timestamps), or 50 (field-based);
BaseFPF=1 (for frame-based timestamps), or 2 (field-based);
Fields=0 (for frame-based timestamps), or 0 or 1 (field-based);

The Offset parameter should then be set to the value of Drift as computed by the process described by the C++ code above (always zero in this case).

Note that the SMPTE timecode can then later be extracted directly from the CountComp, Hours, Minutes, Seconds, and Frames parameters, as its parameter values have been preserved without alteration.

EXAMPLE 4

When film is broadcast in the US, the film material itself is typically shot at 24 frames per second. The broadcast, however, typically takes place at 30,000/1001 frames per second. Accordingly, there is a known practice called "2:3 pull-down" (also referred to as "3:2 pull-down"), that adjusts the content by periodically repeating individual fields of video. One goal of this embodiment is to provide a way of time-stamping video that is shot at 24 frames-per-second, such that when it is broadcast at 30,000/1001 frames-per-second, a properly configured receiver can ascertain the original association of the individual fields that comprise each frame of video to their original film frames and can ascertain the approximate relative timing of those individual fields.

Figures 5, 6:
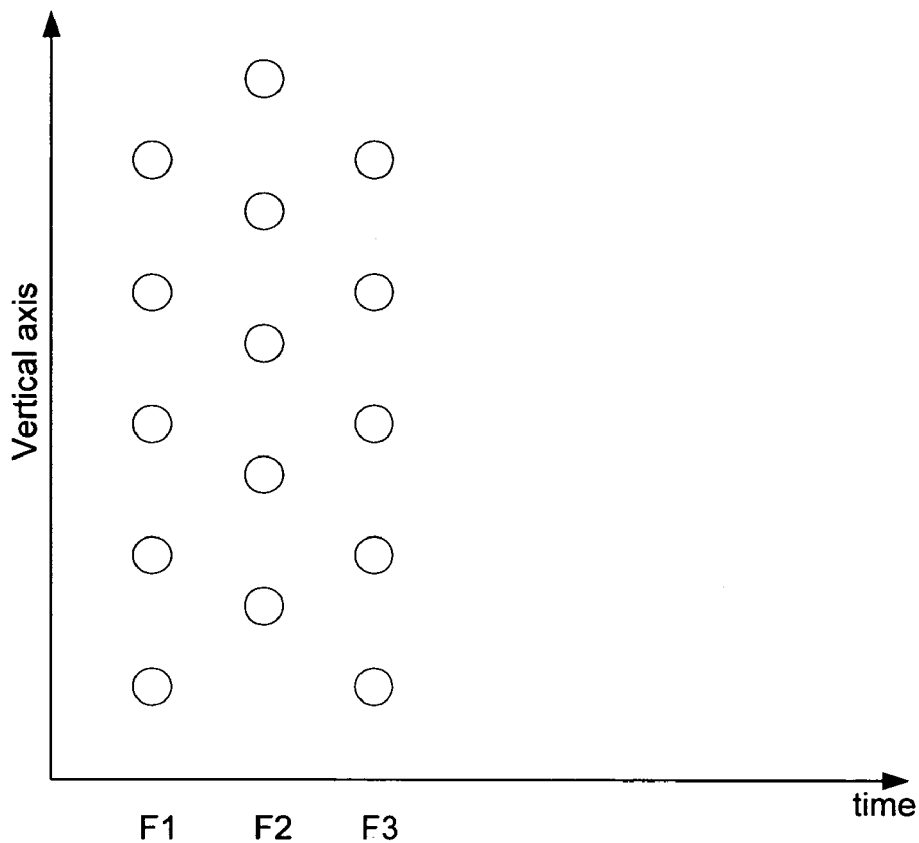
FIG. 5 illustrates the concept of fields, as such pertains to media sample frames.
FIG. 6 illustrates an exemplary timecode counter having field counter, offset, seconds and frames parameters.

Consider, for example, FIG. 5 and the explanation that follows. A video frame can, for example, have two fields—one designated F1, the other designated F2. When the video frame is shot at 24 frames per second, each of these fields is shot at the same time (because the frame that contains the two fields was shot at the same time). That is, if there were a timecode associated with F1 and F2 in the original video as shot, it should have the same timecode value.

The 2:3 pull-down process, however, repeats these fields in a predetermined manner when they are broadcast, and broadcasts the fields at different times. For example, field F1 is typically broadcast at time 1, followed by field F2 at a different time 2, followed by field F1 at yet a different time 3. When the individual fields of a common frame are repeated, bear in mind that they were actually sampled at the same time, but are being broadcast at a different time.

A timecode for each field of a 24 picture-per-second film which has been stretched by a factor of 1001/1000 and converted using "2:3 pull-down" for use in NTSC video can be generated to indicate, via the offset parameter, the stretched timing and progressive-sampling nature of the pictures that underlies the converted interlaced timing for NTSC field-oriented broadcast.

Film material shot at 24 pictures per second is normally converted to NTSC video by scanning each picture to create two fields of alternating lines and, in every sequence of four pictures, repeating the transmission of the first of every second and fourth picture after sending the first and second fields of the picture, thus converting every four film-frame 24 frame per second pictures to ten fields of 30,000/1001 frame per second video. This slows down the overall timing by a factor of 1001/1000 and allows the film to be displayed as fields of interlaced video. However, it is useful to be able to recover the underlying non-interlaced pictures by identifying which fields actually belong together in their sampled timing.

What should ideally occur is that an indication should be made that a particular field was sampled at exactly the same time as its other associated fields. In accordance with this described embodiment, there is a way that one can show the actual time on each field of video when field repetition occurs in broadcasting film. This is done by using a field counter and the offset parameter described above. Before, however, a specific discussion of how this can be done, consider the following:

The human eye can perceive flicker depending on the brightness of the display if the display is refreshed at a rate less than about 60 times/sec. If the flicker rate of what is being displayed to you is very high, your eye won't see it.

There is an interesting tradeoff between trying to represent motion and trying to get rid of flicker. In the early days of television, it was determined that the display had to be repainted a number of times to show motion. To avoid having to repaint the whole display to show motion, the concept of an interleaved display was developed. This concept involves displaying half of the lines of video at one time, and then 1/60th of a second later displaying the other half of the lines. By doing this, a viewer perceives motion normally, and you can eliminate the flicker.

Using this approach, however, you are only getting 30 actual full pictures in one second—or, to be more precise, you are getting 60 half pictures in one second. So, if you look at what is being shown on the display vertically, if you count 0 being the top line, 1 the next line and so on, what you will see is lines 0, 2, 4, 6, 8, etc. at time 1, and then $1/60^{th}$ of a second later, you will see lines 1, 3, 5, 7, 9, etc.

A frame of video comprises the entire set of lines on a display. A field of video comprises either the set of even or odd numbered lines on the display, as noted above. In accordance with one embodiment, a timecode representation is provided that gives the ability to have a time tag on each particular field instead of just on a frame. This time tag can then be processed to provide the actual time that an individual field was sampled, notwithstanding the fact that it is broadcast at a time that is different from its other commonly-sampled fields. This is an improvement over SMPTE techniques which provide for timecode representations only on frames.

As an example of how individual fields can be time-stamped, consider FIG. 6 which shows an exemplary timecode counter 600. In this particular timecode counter, the illustrated components include a frame counter 602, a seconds counter 604, an offset counter 606, and a field counter 608. Other standard components that might be found in a SMPTE timecode counter (i.e. hours, minutes) have been eliminated for purposes of this discussion.

In this present example, there are two fields per frame of video. Each field is associated with either the even or odd lines in the video. Accordingly, field counter 608 counts each field by counting between 0 and 1. This is similar in some respects to the way that the frame counter counts frames. Specifically, the field counter 608 is configured to handle the field counting as a sub-unit of a frame.

Thus, if one wants to build a field-based timecode, in this example, there are two fields in a frame. This means that the number of units per second doubles—because instead of each frame being 1001/30,000 second, one needs to say that each field is half that amount of time, i.e. 1001/60,000 second. Accordingly then, there are two fields in a frame where the second field occurs 1001/60,000 sec after the first field of the frame.

This being the case, consider again FIG. 6. For each time that frame counter 602 increments, field counter 608 increments twice. That is, after "0:0:0:0" (i.e. the first row), the field counter increments so that the timecode value is "1:0:0:0". Accordingly, to compute the true time associated with a field, instead of computing the time using only the frame counter as above, the true time is given by the following equation:

$$t = s + ((\text{field\_counter} + FPF * \text{frame\_counter})UP\text{Field} + \text{offset})/UPS$$

This equation can be used, for example, to program a receiver that receives the video at 30,000/1001 frames per second, yet desires to extract the original timing information associated with the 24 frames-per-second film. This may involve a minor stretching of the time durations by a factor of 1001/1000, but will not distort the regularly-spaced characteristics of the fields that are transmitted—as does operation without the offset factor.

This approach recognizes that there is an integer number of fields in a frame, and, instead of just a frame counter, there is an additional field counter that is provided that enables each field to carry its own timestamp which provides information that can be used to calculate the true time associated with the field.

23.976 Frames Per Second in NTSC with SMPTE Non-Drop Counting

The underlying picture sampling timing as stretched to 24,000/1001 (approximately 23.976) frames per second, can be indicated as underlying a SMPTE non-drop timecode, as per the following:
MaxDays=1;
CountComp='00'; (no counting compensation)
BaseUPF=2002;
BaseUPS=120000;
BaseFPF=2;
Fields=0 or 1 (field-based);

First a five-element array is defined as follows: Z[5]={0, −2002, 1001, −1001, −3003}. Next, the Offset is set to Drift+Z[0] for the first transmitted field, to Drift+Z[1] for the second, Drift+Z[2] for the third (which is the first field of the second transmitted picture), Drift+Z[3] for the fourth, Drift+Z[4] for the fifth, Drift+Z[5] for the sixth, then Drift+Z[0] for the seventh, Drift+Z[1] for the eighth, etc., where Drift is computed as described in the C++ code above for each field (initially zero, then incremented by 120 for each time that the Seconds parameter increments).

Figure 7:
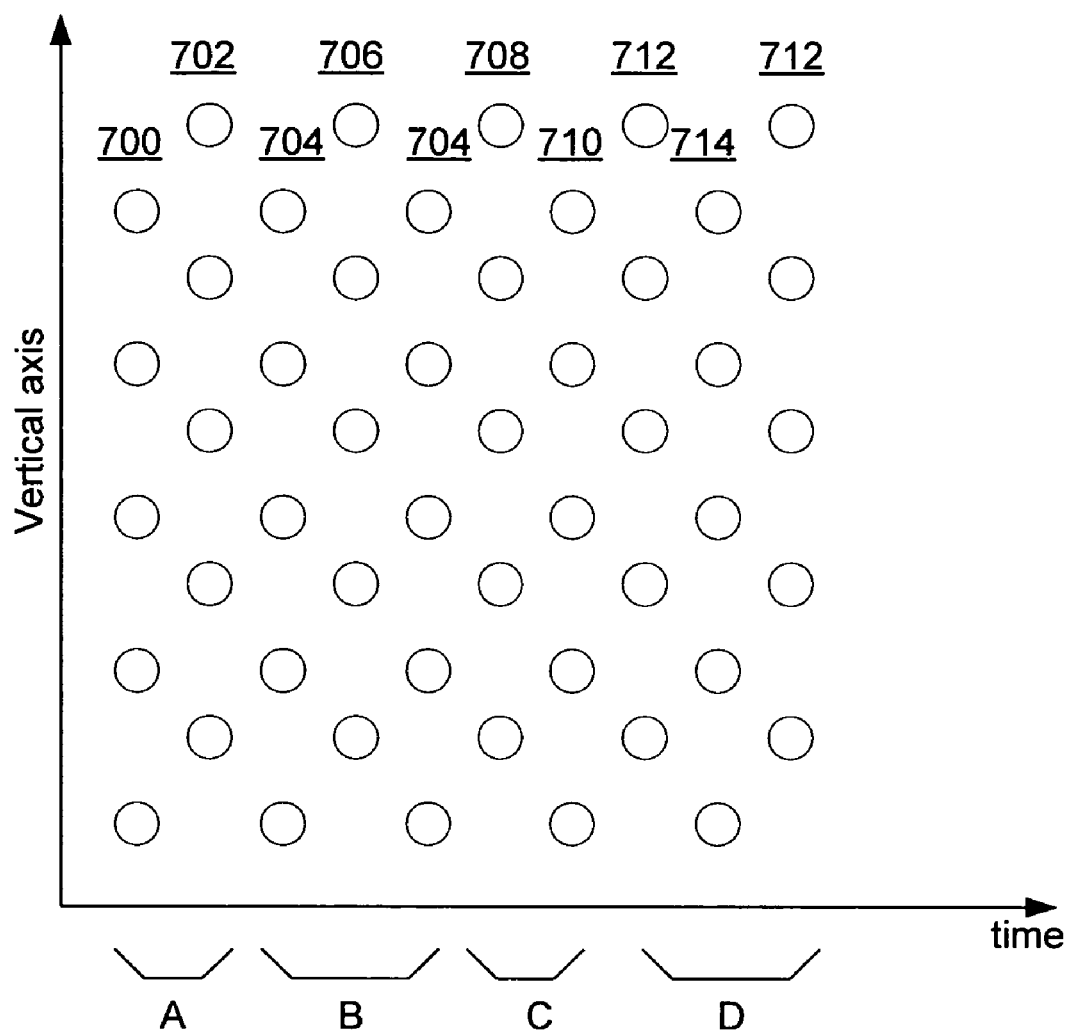
FIG. 7 illustrates the concept of fields, as such pertains to media sample frames and in conjunction with 2:3 pulldown.

As an example of the above approach for representing an underlying picture sampling timing, consider FIG. 7 which shows a graphical representation of video that was shot at 24 frames per second, but broadcast at 30,000/1001 frames per second using 2:3 pull down. The y-axis represents the vertical axis of the individual frames and is divided into a "top field" that represents a first field, and a "bottom field" that represents a second field. The x-axis is the time axis and represents the time when the individual fields from each frame are received in their 30,000/1001 frame-per-second pulled down configuration.

In this example, there are four frames of video designated frames A, B, C, and D. To get to the depicted graphical representation, one frame of film is taken (e.g. frame A) and the lines within the "top field" are transmitted. This field is indicated at 700. Then the lines that were not transmitted (i.e. the "bottom field" 702) are then transmitted. The next frame—frame B—is then processed and three fields are transmitted by transmitting the top field 704, then the bottom field 706, and then repeating the top field 704. Next, the bottom field 708 for frame C is transmitted, followed by the top field 710 for frame C. And finally, three fields for frame D are transmitted by transmitting bottom field 712, then top field 714, and then repeating bottom field 712.

This process of alternating two-fields of a frame—three fields of another frame, is then repeated. All of the lines in the fields comprising a single frame were sampled at the same time. Yet, however, these lines or fields are transmitted at separate times. The result of this is that every other 24 frame per second frame is going to last longer than it normally would if, for example, you were watching the movie as shot, and the remaining frames will be displayed for somewhat less time than the original timing would indicate—producing, on average, approximately the correct overall duration of the program.

Specifically, what this process provides is, for four frame times at 24 frames per second (which is 4 intervals of ¹⁄₂₄ of a second=0.166666), you now have ten fields of video which is 10*(1001/60,000)=10,010/60,000=0.16683333. These two values are approximately equal, and differing only by a factor of 1001/1000.

There is, however, a problem here. Specifically, if you receive the video in the 2:3 pull down form, and you want to try to put it back together in the original time that it was sampled, prior to the embodiment described above, you could not do it. That is, instead of trying to see the actual broadcast times of the sample (where each field has a different timestamp), you wish to see the original timing of the sample (where, for example, individual fields of the same frame have the same timestamp).

Thus, ideally, what you want and, in fact, what the above-described embodiment provides is a timestamp on each one of the fields that has the true sample time of that field, or can be used to ascertain the true sample time of the field—even though the fields were transmitted at different times.

This embodiment provides a way of putting timecodes on the fields that, instead of indicating a set of time intervals that is fundamentally inaccurate (i.e. the set of time intervals that coincide with the broadcast time of the individual fields of video), each field represents the time associated with the original film frame—slightly stretched by a factor of 1001/1000. So then, a video receiver can know how it can put the data back together into its original form when things are sampled at the correct times relative to each other.

As an example of how this can be done, consider the equation below, FIG. 6, and the example below:

$$t = s + ((\text{field\_counter} + FPF * \text{frame\_counter})UP\text{Field} + \text{offset})/UPS$$

In this case, UPField=2002 (because you need to be able to show times that are half way between the times that you would otherwise calculate), UPS=120,000 (because of the interaction between the 24 frames/sec and the 30 frames/second), and FPF=2.

For the first field, s=0, field_counter=0, frame_counter=0 and offset=Z[0] or 0. Accordingly, the time t=0 which is what one would expect. For the second field (which is the second field of the first film frame), one would expect time t=0 as well, since that field was captured at the same time as the first field. In this case, s=0, field_counter=1, frame_counter=0, and offset=z[1] or −2002. Using these numbers in the above equation, t=0+((1+2*0)*2002−2002)/120,000=0 as expected. For the third field (which is the first field of the second film frame), one would expect time t=1001/24,000, indicating that it is in the next film frame. In this case, s=0, field_counter=0, frame_counter=1, and offset=z[2] or 1001. Using these numbers in the above equation, t=0+((0+2*1)*2002+1001)/120,000=3003/120,000=1001/24,000 as expected.

23.976 Frames per Second in NTSC with SMPTE Non-Drop Counting

The underlying picture sampling timing as stretched to 24,000/1001 (approximately 23.976) frames per second can be indicated as underlying a SMPTE Drop-Frame timecode, as per the following:

MaxDays=1;
CountComp='01'; (SMPTE drop-frame counting compensation)
BaseUPF=2002;
BaseUPS=120000;
BaseFPF=2;
Fields=0 or 1 (field-based);

Define the five-element array Z[5]={0, −2002, 1001, −1001, −3003}. Set Offset to Drift+Z[0] for the first transmitted field, to Drift+Z[1] for the second, Drift+Z[2] for the third (which is the first field of the second transmitted frame), Drift+Z[3] for the fourth, Drift+Z[4] for the fifth, Drift+Z[5] for the sixth, then Drift+Z[0] for the seventh, Drift+Z[1] for the eighth, etc., where Drift is computed as shown in the C++ code above (i.e. initially zero, then incremented by 120 for each time that the Seconds parameter increments, unless this occurs along with two frame count drops at temporal locations, in which case Drift is decremented by 7888 instead).

Effectively, both of the embodiments described above provide a way for time-stamping individual fields such that the time stamps of frames that have been stretched into a different format—here 30,000/1001 frames per second—can be processed to provide the original association of those fields with each other into frames with proper relative sampling times, with a minor adjustment of the original timing by a factor of 1001/1000. In accordance with these embodiments, fields that comprise a common frame will evaluate to the same sampled time value, rather than a time value associated with its actual broadcast time.

Design Improvement Relative to other Timecodes

The above-described embodiments have characteristics that can clearly improve other timecodes. Specific examples of this are given below.

Improvement Relative to SMPTE Timecode

A timecode widely used in the video production industry is known as SMPTE timecode, and is normally represented in manner equivalent to that shown in Table 3. Its use is so common that interworking with SMPTE timecode is essential in the video production environment.

TABLE 3

SMPTE Timecode

| Parameter Name | Parameter Type | Size (bits) | Range of Values |
|---|---|---|---|
| DropFlag | bool | 1 | 0 or 1 |
| NTSCvsPAL | bool | 1 | 0 or 1 |
| Hours | int | 5 or more | 0 to 23 |
| Minutes | int | 6 or more | 0 to 59 |
| Seconds | int | 6 or more | 0 to 59 |
| Frames | int | 5 or more | 0 to 29/0 to 24 |

If NTSCvsPAL is 0, BaseUPF=1001 and BaseUPS=30,000; otherwise, BaseUPF=1 and BaseUPS=25. BaseFPF is implicitly 1, although the SMPTE timecode is actually typically used with interlaced-scan video (which has two interlaced fields per frame).

SMPTE timecode has no direct 1:1 correspondence with true time, so a conversion between SMPTE timecode and true time cannot be truly expressed. The DropFlag flag indicates a choice between no counting compensation and the SMPTE drop-frame counting compensation as described above.

The disadvantages of this timecode are enumerated as follows:

It does not accurately relate to true "wall clock" time— instead it starts at a time that is not precisely known (only known to a frame increment in temporal resolution) and accumulates a "drift" relative to "wall clock" time as it progresses (a drift which is reduced but not eliminated by the use of "drop frame" counting).

It does not specify single-field time increments for interlaced video, despite the fact that it is primarily used in interlaced video environments.

If a SMPTE timecode is converted directly to a "wall clock" time which does not have all of the Hours, Minutes, Seconds, Frames, and DropFlag parameters, the time measurement cannot be easily and unambiguously converted back to a SMPTE timecode.

Since its equivalent of BaseUPF and BaseUPS allow only a couple of fixed values, it cannot represent some frame rates precisely.

It includes no representation of a field count parameter, despite being primarily applied to video with two interlaced fields per frame (and its BaseUPS does not have sufficient temporal accuracy to precisely represent the timing of the two interlaced fields of each frame).

In contrast, the design described above can carry a SMPTE timecode without altering it, while also being able to represent a precise relationship between the time of a sample and a true "wall clock" time. Its compatibility with SMPTE time makes it capable of wide use in the video production industry, but it also corrects the temporal ambiguity resulting from use of SMPTE timecodes.

Improvement Relative to MPEG-2:2000 N3438 Draft Amend. 1

MPEG-2:2000 N3438 Draft Amendment 1 [International Standardization Organization and International Electrotechnical Commission Joint Technical Committee Number 1 Working Group Number 11 Moving Picture Experts Group document N3438 Video Elementary Stream Supplemental Information: June 2000] contains a timecode format that is equivalent to that shown in Table 4.

TABLE 4

MPEG-2: 2000 N3438 Timecode Design

| Parameter Name | Parameter Type | Size (bits) | Range of Values |
|---|---|---|---|
| Discont | bool | 1 | 0 or 1 |
| Hours | int | 5 or more | 0 to 23 |
| Minutes | int | 6 or more | 0 to 59 |
| Seconds | int | 6 or more | 0 to 59 |
| Offset | int | 7 or more | ≧0 |

The equivalent timestamp is calculated as follows:

$$t = (60 \cdot (60 \cdot Hours + Minutes) + Seconds + Offset/27,000,000$$

The disadvantages associated with this timecode are as follows:

It has no concept of frame or field counters, only absolute time.

It has no concept of a time increment associated with an inter-frame or inter-field interval.

As it has no frame counter, it cannot represent drop-frame counting of frames.

It cannot directly carry a SMPTE timecode.

If a SMPTE timecode is converted to a timestamp in this format, it cannot be readily converted back to a SMPTE timecode.

Since its equivalent of BaseUPS (the constant 27,000,000) has a fixed value, it cannot represent some frame rates precisely.

The above-described embodiments can improve upon these disadvantages as will be apparent to those of skill in the art.

Improvement Relative to ITU-T H.263+ Frame Times

In H.263+ [International Telecommunications Union—Telecommunications Standardization Sector, ITU-T Recommendation H.263 version 2: 1998], time is represented in manner equivalent to that shown in Table 5.

TABLE 5

H.263+ Time Representation

| Parameter Name | Parameter Type | Size (bits) | Range of Values |
|---|---|---|---|
| ClockBaseAdd1 | bool | 1 | 0 or 1 |
| ClockDivisor | int | 7 | 1 to 127 |
| Frames | int | 8 or 10 | $\geq 0$ |

The equivalent timestamp is calculated as follows:

$$t = \text{Frames} \cdot (\text{ClockDivisor} \cdot (1000 + \text{ClockBaseAdd1}))/1,800,000$$

The disadvantages associated with this timecode are as follows:

It cannot directly carry a SMPTE timecode.

If a SMPTE timecode is converted to a timestamp in this format, it cannot be readily converted back to a SMPTE timecode.

Since its equivalent of BaseUPS (the constant 1,800,000) has a fixed value, it cannot represent some frame rates precisely.

It has no field counter, and thus cannot indicate timestamps for a division of frames into fields.

As will be appreciated by those of skill in the art, the inventive approaches described above can improve upon one or more of these disadvantages.

Improvement Relative to MPEG-4 Visual VOP Time

The MPEG-4 Visual standard [International Standards Organization and International Electrotechnical Commission, International Standard 14496-2: 1999] represents timecode in a manner equivalent to that shown in Table 6.

TABLE 6

MPEG-4 Visual VOP Time

| Parameter Name | Parameter Type | Size (bits) | Range of Values |
|---|---|---|---|
| BaseUPS | int | 16 | $\geq 0$ |
| Hours | int | 5 or more | 0 to 23 |
| Minutes | int | 6 or more | 0 to 59 |
| Seconds | int | 6 or more | 0 to 59 |
| AddSec | int | 1 or more | $\geq 0$ |
| Offset | int | 1 to 16 | 0 to BaseUPS − 1 |
| FixedIncrement | int | 1 to 16 | 0 to BaseUPS − 1 |
| FixedRateFlag | bool | 1 | 0 or 1 |

The equivalent timestamp can be calculated as follows:

$$t = 60 \cdot (60 \cdot \text{Hours} + \text{Minutes}) + \text{Seconds} + \text{AddSec} + \text{Offset}/\text{BaseUPS}$$

When FixedRateFlag is 1, the time difference between the timestamps of every adjacent pair of samples must be equal to FixedIncrement.

The disadvantages associated with this timecode are as follows:

When FixedRateFlag is 0, it has no concept of a frame counter, only an absolute time.

When FixedRateFlag is 1, it has no ability to indicate skipped samples and has no flexibility on the amount of time indicated between pairs of samples.

Since it does not use a BaseUPF to multiply a frame count, the number of bits required to represent the location of a sample timestamp within a one second interval is larger than would be necessary if using a BaseUPF (in contrast with the H.263+ design, for example). If a BaseUPF were used instead, then just having a frame or field counter using a small number of bits which increments by one with each sample would be all that would be necessary to represent frame time increments, and a simple increment by two could indicate a skipped frame sample.

It has no concept of a time increment associated with an interframe interval.

As it has no frame counter, it cannot represent drop-frame counting of frames.

It cannot directly carry a SMPTE timecode.

If a SMPTE timecode is converted to a timestamp in this format, it cannot be readily converted back to a SMPTE timecode.

The above-described inventive approaches can improve upon one or more of these disadvantages, as will be apparent to those of skill in the art.

Improvement Relative to Timecode Object (TCO) Draft

A preliminary design has been circulated in the video production industry of a "timecode object" for a draft specification of a timecode for use in television, audio, and film production [Brooks Harris, Proposed SMPTE Standard S22.TCOx1-1999 Nov. 18, 1999]. The design circulated is in draft form and appears to contain some errors, but it appears essentially equivalent to that shown in Table 7.

TABLE 7

Timecode Object (TCO) Draft

| Parameter Name | Parameter Type | Size (bits) | Range of Values |
|---|---|---|---|
| NTSCvsPAL | bool | 1 | 0 or 1 |
| CountComp | enum | 2 | 3 enum values |
| SampleRate | enum | 5 | 16 enum values |
| Frames | int | 5 | $\geq 0$ |
| Field | int | 1 | 0 or 1 |
| NPTtime | int | 64 | $\geq 0$ |

It contains a Frames counter, a Field indication, and a representation of wall clock time. It uses a specification of a sampling rate by selecting from among a number of specific sampling rates. It contains an indicator for whether to use SMPTE "drop frame" counting or a specific counting method known as a "1000 day compensated count" which reduces drift error by using a specific counting pattern in a 1000 day period. The "1000 day compensated count" is a specific counting method that does not use a calculation of drift accumulation (instead it uses a fixed counting pattern similar to but more complex than the "drop frame" method of SMPTE 12M timecode). It contains some specific provisions for dealing with leap days, leap seconds, and time zones. It does not contain a method for offsetting a frame-based timecode to reference it to a true wall clock time based on a general timebase in units per second. It does contain "wall clock" date and time parameters, but these are represented in network time protocol (NTP) [Internet Engineering Task Force Request For Comments number 1305] units (not in units per second having a customizable relationship with the sampling rate). The NTP units of time use fixed measurement units of approximately $2^{-32}$ seconds (i.e., its equivalent of BaseUPS has a fixed value of $2^{32}$, a number which is not an integer multiple of conventional timebase sampling units such as 30,000 or 25) and thus these representations use a fixed precision that is not compatible with common sampling rates, contain rounding error, and are not based on the sampling timing. It cannot always carry a SMPTE 12M timecode without alteration, due to the drift between the SMPTE 12M representation of time and the time represented in this timecode's NTP time parameter. Disadvantages of this timecode object design include:

- It only specifies sampling rates using an enumeration of selected specific sampling rates, not a general representation of time using a BaseUPS number of units per second and a BaseUPF number of units per frame.
- It cannot represent the true time of a sample without rounding error using a customized BaseUPS number of units per second (true time is represented only in NTP units having a fixed number of increments per second).
- Conversion between its representation of time (using NTP) and the conventional SMPTE 12M timecode is not well defined, as it does not contain a representation that directly corresponds to the same values as the Hours, Minutes, and Seconds parameters found in the SMPTE 12M timecode (since its NTP time is not directly based on the values of the Hours, Minutes and Seconds parameters that would be found in the conventional SMPTE 12M timecode due to drift between conventional SMPTE 12M time and NTP time).
- It does not contain a method of counting compensation based on a direct computation of accumulated drift. Instead it defines a new and complex special method of counting to reduce drift using a specific "1000 day count".

The inventive approaches described above improve upon one or more of these disadvantages as will be apparent to those of skill in the art.

Counting Compensation

In accordance with another embodiment, various methods are provided for eliminating drift over time. A first embodiment is referred to as "top drop" counting, and a second embodiment is referred to as "bottom drop" counting.

Top Drop Counting

In accordance with one described embodiment, a method is provided that compensates for drift between a media sample frame count time representation, and true "wall clock" time by computing the drift between the time represented by the hours, minutes, seconds, and frame count and the true "wall clock" time of the sample, and skipping over the maximum frame number on occasion to prevent excessive drift. For example, the maximum frame number may be skipped whenever the accumulated drift exceeds the time represented by a frame count increment.

Figure 8:
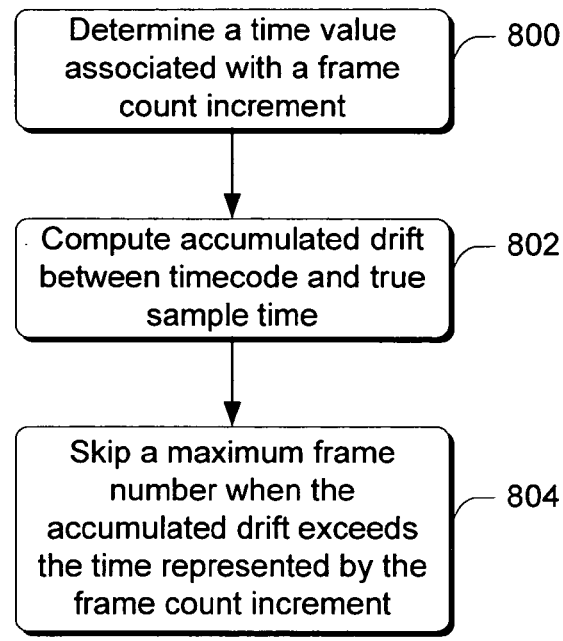
FIG. 8 is a flow diagram that describes steps in a method in accordance with one embodiment.

FIG. 8 is a flow diagram that describes steps in a method in accordance with one top drop counting method. The method can be implemented in any suitable hardware, software, firmware, or combination thereof. In the illustrated example, the method is implemented in software.

Step 800 determines a time value associated with a frame count increment. Recall from the examples above that when media samples are timecoded, each frame of a media sample has an increment of time associated with it. For example, each frame count increment might constitute an increment of 1/24 second. This step determines the time value associated with that frame count increment. Step 802 computes an accumulated drift between a timecode associated with a media sample, and the true "wall clock" time or true sample time associated with that media sample. Step 804 skips a maximum frame number when the accumulated drift exceeds the time represented by a frame count increment.

As an example, consider the following: In order to eliminate drift over time, the Frames parameter (as described above) will sometimes count up from 0 to MaxFPS-1 and will sometimes count up only from 0 to MaxFPS-2 (dropping the top count). (MaxFPS is defined above). If the basic frame rate is 7.3 frames per second, then sometimes there will be seven frames counted in a second and sometimes eight (so the Frames count will sometimes count from 0 up to 6 and sometimes from 0 up to 7).

Bottom Drop Counting

In accordance with one described embodiment, a method of compensating for drift between a media sample frame count time representation and true "wall clock" time is provided by computing the drift between the time represented by the hours, minutes, seconds, and frame count and the true "wall clock" time of the sample, and skipping over the minimum frame number on occasion to prevent excessive drift. For example, the minimum frame number may be skipped whenever the accumulated drift exceeds the time represented by a frame count increment.

Figure 9:
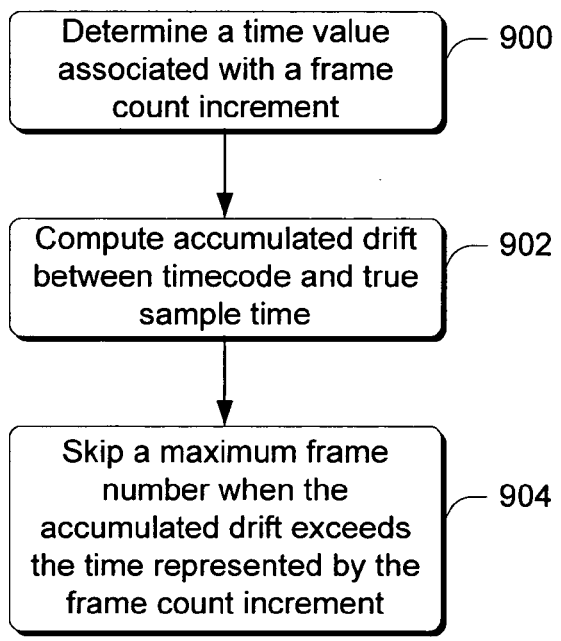
FIG. 9 is a flow diagram that describes steps in a method in accordance with one embodiment.

FIG. 9 is a flow diagram that describes steps in a method in accordance with one bottom drop counting method. The method can be implemented in any suitable hardware, software, firmware, or combination thereof. In the illustrated example, the method is implemented in software.

Step 900 determines a time value associated with a frame count increment. This step is essentially the same as step 800 above. Step 902 computes an accumulated drift between a timecode associated with a media sample, and the true "wall clock" time or true sample time associated with that media sample. This step is essentially the same as step 802 above. Step 904 skips a minimum frame number when the accumulated drift exceeds the time represented by a frame count increment.

As an example, consider the following: In order to eliminate drift over time, the Frames parameter will sometimes count up from 0 to MaxFPS-1 and sometimes will sometimes count up only from 1 to MaxFPS-1 (dropping the bottom count). This counting method is similar to that of the top-dropping method above, but in this case, the Frames parameter value of 0 that is skipped rather than the highest value of the Frames parameter.

CONCLUSION

Various embodiments described above provide a means by which an accurate reference to "true time" can be provided in a timecode associated with a media sample. The embodiments can be compatible with existing timecode paradigms by containing the fields of these existing timecode designs without alteration, although possibly adding one or more additional parameters to enhance the capability of the design. Additionally, improvements are achieved in the form of new counting compensation methods.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of processing media samples comprising:
providing multiple media samples at a frame rate in which there are a non-integer number of frames per unit of time associated with a media sample timecode;
providing an adjustable offset parameter that is associated with the timecode and which describes a difference between the time represented by a timecode and a represented time;
using the adjustable offset parameter, calculating a true time value associated with one or more of the media samples; and
using the true time value to reduce a timecode drift associated with the multiple media samples.

2. The method of claim 1 further comprising adjusting the offset parameter for at least one of the media samples.

3. The method of claim 1 further comprising adjusting the offset parameter for at least one of the media samples in accordance with occurrence of a pre-determined condition.

4. A method of processing media samples comprising:
providing multiple media samples;
counting frames associated with the media samples to provide a frame count;
counting fields associated with the media samples to provide a field count;
calculating an offset parameter associated with the media samples and configured for use in calculating a represented time associated with the media samples, wherein the offset parameter is adjustable; and
timestamping one or more of the media samples with a timestamp comprising a frame count, field count, adjustable and offset parameter.

5. The method of claim 4, wherein there are two fields per frame for each media sample.

6. The method of claim 4, wherein said timestamping comprises timestamping the media samples with SMPTE timecode parameters.

7. The method of claim 4, wherein said calculating comprises adjusting an offset parameter value at least once.

8. The method of claim 4, wherein said calculating comprises adjusting an offset parameter value at least once and in accordance with one or more dropped frames.

9. The method of claim 4, wherein said calculating comprises adjusting an offset parameter value at least once and in accordance with a seconds counter rolling over.

10. The method of claim 4, wherein the represented time can be calculated in accordance with the following equation:

$$t = x + ((\text{field\_counter} + FPF * \text{frame\_counter}) UP\text{Field} + \text{offset})/UPS,$$

where,
x is a measure of time associated with a media sample;
"frame_counter" is the frame number associated with a media sample;
"UPField" comprises a number of basic units of time to be added for each field count increment;
"offset" specifies a difference between the time represented by a timecode associated with the media sample and the represented time; and
"UPS" comprises the number of basic units of time in a timebase per unit of time.

11. A method of processing media samples comprising:
receiving multiple media samples individual ones of which have been timestamped with a timestamp comprising a frame count, field count, and offset an adjustable offset parameter, the frame count being associated with a frame number that corresponds to a media sample, the field count being associated with a field number that corresponds to a particular frame, and the offset parameter being associated with a represented time associated with a media sample;
calculating a represented time associated with a media sample using the adjustable offset parameter;
using the adjustable offset parameter to calculate the true time associated with the media samples; and
using the true time value to reduce a timecode drift associated with the multiple media samples.

12. The method of claim 11, wherein said calculating comprises calculating the represented time in accordance with the following equation:

$$t = x + ((\text{field\_counter} + FPF * \text{frame\_counter}) UP\text{Field} + \text{offset})/UPS,$$

where,
x is a measure of time associated with a media sample;
"frame_counter" is the frame number associated with a media sample;
"UPField" comprises a number of basic units of time to be added for each field count increment;
"offset" specifies a difference between the time represented by a timecode associated with the media sample and the represented time; and
"UPS" comprises the number of basic units of time in a timebase per unit of time.

* * * * *